(12) United States Patent
Kaneko et al.

(10) Patent No.: US 10,211,613 B2
(45) Date of Patent: Feb. 19, 2019

(54) PROTECTIVE TUBE ATTACHING METHOD

(71) Applicant: YAZAKI CORPORATION, Tokyo (JP)

(72) Inventors: Akihiko Kaneko, Hiroshima (JP); Tomoyasu Murakami, Hiroshima (JP)

(73) Assignee: YAZAKI CORPORATION, Tokyo (JP)

( * ) Notice: Subject to any disclaimer, the term of this patent is extended or adjusted under 35 U.S.C. 154(b) by 253 days.

(21) Appl. No.: 15/145,433

(22) Filed: May 3, 2016

(65) Prior Publication Data
US 2016/0248236 A1 Aug. 25, 2016

Related U.S. Application Data

(63) Continuation of application No. PCT/JP2014/083804, filed on Dec. 19, 2014.

(30) Foreign Application Priority Data

Dec. 20, 2013 (JP) .................................. 2013-264123
Dec. 20, 2013 (JP) .................................. 2013-264124

(51) Int. Cl.
*H02G 3/04* (2006.01)
*H01R 43/20* (2006.01)
(Continued)

(52) U.S. Cl.
CPC ......... *H02G 3/0487* (2013.01); *B29C 53/086* (2013.01); *B29C 65/565* (2013.01);
(Continued)

(58) Field of Classification Search
CPC ...... H02G 3/0481; H02G 3/0487; H02G 3/06; H02G 3/08; H02G 3/32; H02G 1/08;
(Continued)

(56) References Cited

U.S. PATENT DOCUMENTS

| | | | | |
|---|---|---|---|---|
| 7,467,980 B2* | 12/2008 | Chiu | ...................... | H01R 13/18 439/843 |
| 7,476,127 B1* | 1/2009 | Wei | ...................... | H01R 24/54 439/583 |
| 2011/0201887 A1 | 8/2011 | Greenblatt et al. | | |

FOREIGN PATENT DOCUMENTS

| CN | 201836580 U | 5/2011 |
|---|---|---|
| CN | 102186429 A | 9/2011 |

(Continued)

OTHER PUBLICATIONS

Machine Language (English) Translation of Japanese Patent Publication, JP 2008-159529, dated Jun. 2018.*

(Continued)

*Primary Examiner* — A. Dexter Tugband
(74) *Attorney, Agent, or Firm* — Kenealy Vaidya LLP

(57) ABSTRACT

A protective tube attaching method, the protective tube protecting an electric wire of a wire harness, includes inserting the electric wire through a small diameter protective tube and a large diameter protective tube which covers and is shorter than the small diameter protective tube so as to be movable relatively thereto; positioning one end portion of the large diameter protective tube at one reference portion of the wire harness; moving the small diameter protective tube relatively to the large diameter protective tube positioned at the one reference portion, to thereby position the other end portion of the small diameter protective tube at the other reference portion of the wire harness; and fixing the other end portion of the large diameter protective tube in a state that the other end portion of the large diameter protective tube overlaps with an outer circumferential surface of the small diameter protective tube.

6 Claims, 9 Drawing Sheets

(51) Int. Cl.
| | | |
|---|---|---|
| *H02G 3/08* | (2006.01) | |
| *H01R 13/18* | (2006.01) | |
| *B60R 16/02* | (2006.01) | |
| *H02G 3/06* | (2006.01) | |
| *B29C 53/08* | (2006.01) | |
| *B29C 65/56* | (2006.01) | |
| *H01B 7/00* | (2006.01) | |
| *H01B 19/00* | (2006.01) | |
| *H02G 1/08* | (2006.01) | |
| *H01R 24/54* | (2011.01) | |
| *H02G 3/32* | (2006.01) | |
| *B29C 65/50* | (2006.01) | |
| *B29K 27/06* | (2006.01) | |
| *B29L 31/34* | (2006.01) | |

(52) U.S. Cl.
CPC ....... *B60R 16/0215* (2013.01); *H01B 7/0045* (2013.01); *H01B 19/00* (2013.01); *H01R 13/18* (2013.01); *H01R 43/20* (2013.01); *H02G 1/08* (2013.01); *H02G 3/0481* (2013.01); *H02G 3/06* (2013.01); *H02G 3/08* (2013.01); *B29C 65/5042* (2013.01); *B29K 2027/06* (2013.01); *B29L 2031/34* (2013.01); *H01R 24/54* (2013.01); *H02G 3/32* (2013.01); *Y10T 29/49169* (2015.01); *Y10T 29/49208* (2015.01)

(58) Field of Classification Search
CPC ........ H01R 43/20; H01R 13/18; H01R 24/54; H01B 7/0045; H01B 19/00; B29K 2027/06; B29K 2031/34; B60R 16/0215; B29C 53/086; B29C 65/565; B29C 65/5042; Y10T 29/49169; Y10T 29/49208
See application file for complete search history.

(56) References Cited

FOREIGN PATENT DOCUMENTS

| | | | |
|---|---|---|---|
| JP | 11-37349 A | | 2/1999 |
| JP | 2000-166053 A | | 6/2000 |
| JP | 2003-65426 A | | 3/2003 |
| JP | 2008159529 A | * | 7/2008 |
| JP | 2010272301 A | * | 12/2010 |
| JP | 2013-251947 A | | 12/2013 |

OTHER PUBLICATIONS

Machine Language (English) Translation of Japanese Patent Publication, JP 2010-272301, dated Jun. 2018.*
English language Written Opinion of the International Search Report for PCT/JP2014/083804 dated Mar. 3, 2015.
Chinese Office Action for the related Chinese Patent Application No. 201480069875.5 dated Mar. 15, 2017.
International Search Report and Written Opinion of the International Search Report for PCT/JP2014/083804 dated Mar. 3, 2015.
Japanese Office Action for the related Japanese Patent Application No. 2013-264123 dated Nov. 14, 2017.
Japanese Office Action for the related Japanese Patent Application No. 2013-264123 dated Aug. 15, 2017.
Japanese Office Action for the related Japanese Patent Application No. 2013-264124 dated Sep. 19, 2017.

* cited by examiner

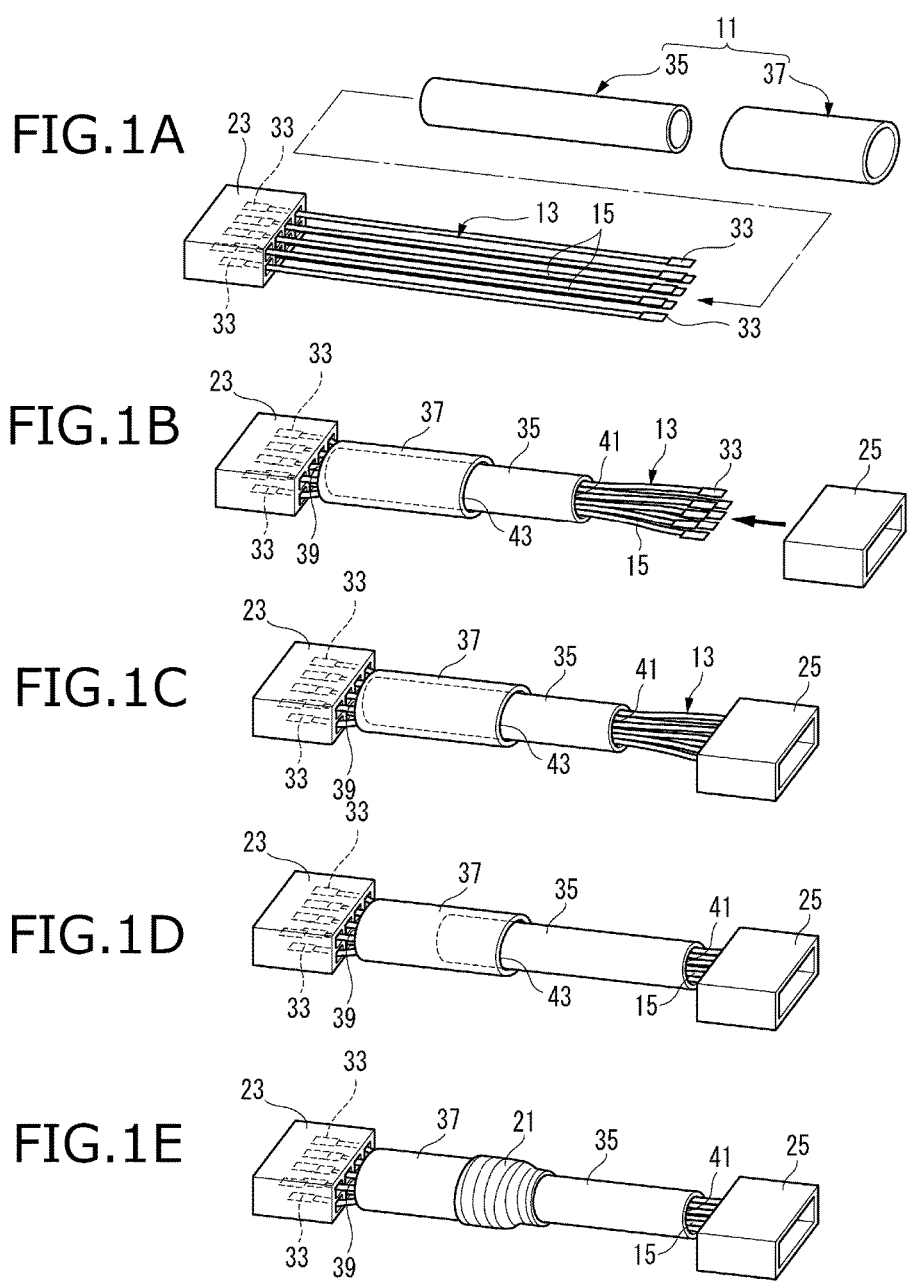

PROTECTIVE TUBE ATTACHING METHOD

CROSS REFERENCE TO RELATED APPLICATIONS

This application is a continuation of PCT application No. PCT/JP2014/083804, which was filed on Dec. 19, 2014 based on Japanese Patent Application (No. P2013-264123) filed on Dec. 20, 2013 and Japanese Patent Application (No. P2013-264124) filed on Dec. 20, 2013, the contents of which are incorporated herein by reference.

BACKGROUND OF THE INVENTION

1. Field of the Invention

The present invention relates to a protective tube and a protective tube attaching method.

2. Description of the Related Art

A wire harness to be arranged on a vehicle such as a car has a configuration as follows. That is, in an electric wire bundle (trunk line) in which a plurality of electric wires are bundled, predetermined electric wires (branch lines) are split or connectors are connected to terminal ends of the trunk line or the branch lines. In addition, such a wire harness may be covered with a protective tube made of a flexible resin in order to protect the electric wires. The protective tube is roughly classified into a circular insertion protective tube having a closed sectional shape perpendicular to its tube axis, and a C-shaped protective tube having a slit and hence having an opened sectional shape perpendicular to its tube axis.

For example, the electric wires including terminals crimped at their terminal ends are inserted into the insertion protective tube in advance. The electric wires are exposed from the insertion protective tube in the vicinity of each connector connection portion (underhead part of each connector). In this manner, it is necessary to secure a work margin (margin length for bending the electric wires and inserting the terminals into the connector) when the terminals attached to the terminal ends of the electric wires are inserted into the connector. For this reason, a worker cannot outer-fit the protective tube to the wire harness extremely enough to allow the protective tube to abut against connectors etc. on the opposite end sides of the wire harness. On the other hand, the protective tube with the slit can be outer-fitted through the slit after connector connection work. Thus, the protective tube with the slit can be made to abut against connectors etc. on the opposite end sides of the wire harness. However, an adhesive tape etc. has to be wound on the outer circumference of the protective tube with the slit to thereby restrict the opening thereof. Therefore, extra work or an extra member is required to thereby increase the cost.

Therefore, a protective tube attaching structure of a wire harness disclosed in JP-A-11-37349 or a wire protecting device for use in an automatic transmission and a wire protecting device attaching method disclosed in JP-A-2003-65426 have been known as a solution to such a problem.

The protective tube attaching structure of the wire harness disclosed in JP-A-11-37349 has the following configuration. That is, as shown in FIGS. 8A to 8C, a tape 505 is wound around an electric wire group of a divergence point 503 in a plurality of branch lines 501 to be firmly fixed to the electric wire group. In addition, a common supply tube 507 made of a flexible resin is provided to be outer-fitted to the electric wires 501, and the inner circumferential surface of the common supply tube 507 is made to abut against the tape 505 so that the common supply tube 507 can be moved beyond the tape 505 but retained at a stop position. As shown in FIG. 8A, a slit-including corrugated tube 511 is put on a trunk line 509, and set to be attached to a position where the tape 505 can be exposed from a front end of the corrugated tube 511. When connectors 513 at respective branch line terminal ends are connected to a partner component 515, the common supply tube 507 is retained at a position on the trunk line side, as shown in FIG. 8B. After the connectors are connected, the common supply tube 507 is moved and retained to be outer-fitted to the electric wires 501, as shown in FIG. 8C.

In addition, according to the wire protecting device for use in the automatic transmission and the wire detecting device attaching method disclosed in JP-A-2003-65426, a protective tube 519 of a wire harness sub-assembly 517 includes a small-diameter protective tube (small diameter protective tube) 521, and a large-diameter protective tube (large diameter protective tube) 523 which is put on the small-diameter protective tube 521 so as to be movable relatively thereto, as shown in FIG. 9A. The small-diameter protective tube 521 is biased toward a connector 513 and the large-diameter protective tube 523 is biased toward a sensor 525. In this state, the small-diameter protective tube 521 is fixed to a predetermined position of an A/T case 529 by a harness clamp 527. In this state, the harness clamp 527 prevents the large-diameter protective tube 523 from moving toward the connector 513, so as to restrict the position of the large-diameter protective tube 523, as shown in FIG. 9B. Due to the restriction on the position of the large-diameter protective tube 523, a wire exposure portion 531 can be covered with the large-diameter protective tube 523 so as to be protected thereby.

However, in the case of the protective tube attaching structure of the wire harness according to JP-A-11-37349, it is necessary to wind the tube retaining tape 505 to thereby fix the tube retaining tape 505 to the electric wire group firmly. Thus, workability is poor. In addition, in the case of the wire protecting device for use in the automatic transmission and the wire protecting device attaching method disclosed in JP-A-2003-65426, the harness clamp 527 for restricting the position of the large-diameter protective tube 523 is required and the two tubes have to be pressed by hands to do work during attachment. Thus, workability is poor.

SUMMARY OF THE INVENTION

The invention has been accomplished in consideration of the aforementioned situation. It is an object of the invention to provide a protective tube and a protective tube attaching method, in which it is possible to easily perform electric wire protection work for protecting electric wires of a wire harness.

The foregoing object according to the invention can be achieved by the following configurations.

(1) A protective tube for protecting an electric wire of a wire harness, comprising:

a small diameter protective tube; and a large diameter protective tube configured to cover the small diameter protective tube so as to be movable relatively thereto, wherein a sectional shape perpendicular to its tube axis of at least one of the small diameter protective tube and the large diameter protective tube is formed into a non-circular shape which is obtained by pressing and deforming its circular cross-section by a predetermined amount or more, and the small diameter protective tube and the large diameter protective tube which are configured to be moved along a longitudinal direction thereof relatively to each other are frictionally engaged with each other.

According to the protective tube having the aforementioned configuration (1), the small diameter protective tube and the large diameter protective tube are put on (outer-fitted to) outer circumferential sides of the electric wires of the wire harness. Of the electric wire of the wire harness to which the small diameter protective tube and the large diameter protective tube are outer-fitted, one end side serves as one reference portion and the other end side serves as the other reference portion. For example, these reference portions serve as connectors mounted on end portions of the electric wires or divergence portions of branch lines split from a trunk line of the wire harness. When connectors are, for example, disposed on the opposite end sides of the electric wires, one of the connectors is attached to one end side of the electric wires, and the small diameter protective tube and the large diameter protective tube are outer-fitted from the other end side of the electric wires. The other connector is then attached to the other end side of the electric wires to which the large diameter protective tube and the large diameter protective tube have been outer-fitted.

In the protective tube outer-fitted to the electric wires of the wire harness, the small diameter protective tube and the large diameter protective tube are moved (slid) relatively to each other in a direction to extend. Of at least one of the small diameter protective tube and the large diameter protective tube, the sectional shape perpendicular to its tube axis is formed into a non-circular shape which has a circular section pressed and deformed by a predetermined amount or more. Thus, the small diameter protective tube and the large diameter protective tube can be frictionally engaged with each other. The small diameter protective tube and the large diameter protective tube in the extended protective tube are restricted from moving longitudinally relatively to each other, and retained so that the opposite ends of the small diameter protective tube and the large diameter protective tube can be positioned at the one reference portion and the other reference portion. In this manner, it is possible to shift rapidly to a step of fixing the small diameter protective tube and the large diameter protective tube and it is possible to easily perform electric wire protection work for protecting the electric wires of the wire harness.

(2) The protective tube according to the aforementioned configuration (1), wherein the sectional shape perpendicular to the tube axis of each of the small diameter protective tube and the large diameter protective tube is formed into the non-circular shape which is obtained by pressing and deforming its circular cross-section by a predetermined amount or more.

According to the protective tube having the aforementioned configuration (2), retention force generated by friction engagement between the small diameter protective tube and the large diameter protective tube can be adjusted in accordance with a relative rotation angle between the small diameter protective tube and the large diameter protective tube around the tube axis.

(3) A protective tube for protecting an electric wire of a wire harness, comprising:

a small diameter protective tube; and a large diameter protective tube configured to cover the small diameter protective tube so as to be movable relatively thereto, wherein at least one of the small diameter protective tube and the large diameter protective tube is formed into a curved shape which is curved along a longitudinal direction thereof by a predetermined amount or more, and the small diameter protective tube and the large diameter protective tube which are configured to be moved the longitudinal direction thereof relatively to each other are frictionally engaged with each other.

According to the protective tube having the aforementioned configuration (3), when the large diameter protective tube is put on the small diameter protective tube, an outer circumferential surface of the small diameter protective tube makes pressure contact with an inner circumferential surface of the large diameter protective tube at least two places longitudinally separated from each other so that the small diameter protective tube and the large diameter protective tube can be frictionally engaged with each other.

In addition, since at least one of the small diameter protective tube and the large diameter protective tube is formed into a curved shape which is curved along the longitudinal direction thereof, the electric wires inserted through the small diameter protective tube and the large diameter protective tube make pressure contact with an inner circumferential surface of the small diameter protective tube and the inner circumferential surface of the large diameter protective tube at least two places longitudinally separated from each other so that the electric wire can be also frictionally engaged with the small diameter protective tube and the large diameter protective tube. Due to such friction engagement, the small diameter protective tube and the large diameter protective tube in the extended protective tube are restricted from moving the longitudinal direction thereof relatively to each other, and retained so that the opposite ends of the small diameter protective tube and the large diameter protective tube can be positioned at the one reference portion and the other reference portion. In this manner, it is possible to shift rapidly to a step of fixing the small diameter protective tube and the large diameter protective tube and it is possible to easily perform electric wire protection work for protecting the electric wires of the wire harness.

(4) A protective tube attaching method for protecting an electric wire of a wire harness by a protective tube including a small diameter protective tube and a large diameter protective tube, the large diameter protective tube covering the small diameter protective tube so as to be movable relatively thereto, the protective tube attaching method comprising:

a protective tube inserting step of inserting the electric wire through the small diameter protective tube and the large diameter protective tube which covers the small diameter protective tube so as to be movable relatively thereto and which is shorter than the small diameter protective tube;

a large diameter protective tube positioning step of positioning one end portion of the large diameter protective tube at one reference portion of the wire harness;

a small diameter protective tube positioning step of moving the small diameter protective tube relatively to the large diameter protective tube positioned at the one reference portion, to thereby position the other end portion of the small diameter protective tube at the other reference portion of the wire harness; and a protective tube fixing step of fixing the other end portion of the large diameter protective tube in a state that the other end portion of the large diameter protective tube overlaps with an outer circumferential surface of the small diameter protective tube.

According to the protective tube attaching method having the aforementioned configuration (4), of the small diameter protective tube and the large diameter protective tube which are put on (outer-fitted to) the outer circumferential sides of the electric wires of the wire harness, first, the one end portion of the large diameter protective tube is positioned to abut against the one reference portion of the wire harness. In this manner, it is possible to perform initial positioning work easily when the small diameter protective tube and the large diameter protective tube are outer-fitted to the electric wires. It is because the large diameter protective tube is larger in diameter and smaller in contact friction during sliding against the electric wires of the wire harness than the small diameter protective tube.

Then, while the large diameter protective tube is held by one hand of a worker, an exposed part of the small diameter protective tube is held by the other hand of the worker and moved (pulled out) relatively to the large diameter protective tube so as to be positioned at the other reference portion of the wire harness. On this occasion, the small diameter protective tube is longer in length and larger in contract friction against the electric wires of the wire harness than the large diameter protective tube. Accordingly, after the small diameter protective tube has been positioned at the other reference portion, the small diameter protective tube can be prevented from moving unexpectedly easily. That is, positioning work can be performed easily.

Thus, according to the protective tube attaching method having the aforementioned configuration, the large diameter protective tube can be rapidly positioned at the same time as the small diameter protective tube and the large diameter protective tube are outer-fitted to the electric wires of the wire harness. In addition thereto, it is possible to prevent the small diameter protective tube from being positionally displaced easily and it is possible to shift rapidly to the protective tube fixing step.

Consequently, according to the protective tube attaching method having the aforementioned configuration, electric wire protection work becomes excellent when the small diameter protective tube and the large diameter protective tube outer-fitted to the electric wires of the wire harness are slid relatively to each other in a direction along the axis to be extended so that the opposite ends of the small diameter protective tube and the large diameter protective tube can be positioned at the one reference portion and the other reference portion in the wire harness.

(5) A protective tube attaching method according to the aforementioned configuration (4), further comprising:

a section deforming step of forming the sectional shape perpendicular to its tube axis of at least one of the small diameter protective tube and the large diameter protective tube into a non-circular shape by pressing and deforming its circular cross-section by a predetermined amount or more, wherein the section deforming step is performed prior to the protective tube inserting step.

According to the protective tube attaching method having the aforementioned configuration (5), on the condition that the small diameter protective tube and the large diameter protective tube in the protective tube outer-fitted to the electric wire of the wire harness have been slid relatively to each other in a direction along the tube axis to be extended, the large diameter protective tube and the small diameter protective tube which have been extended are frictionally engaged with each other so as to be prevented from moving relatively to each other easily. Thus, after the opposite ends of the small diameter protective tube and the large diameter protective tube have been positioned at the one reference portion and the other reference portion, the small diameter protective tube and the large diameter protective tube in the protective tube can be restricted from being positionally displaced due to unexpected movement.

(6) The protective tube attaching method according to the aforementioned configuration (5), further comprising:

a friction engagement step of rotating the small diameter protective tube and the large diameter protective tube relatively to each other with a predetermined angle around the tube axis when the sectional shape perpendicular to the tube axis of each of the small diameter protective tube and the large diameter protective tube is formed into a non-circular shape, wherein the friction engagement step is performed prior to the protective tube fixing step.

According to the protective tube attaching method having the aforementioned configuration (6), retention force generated due to friction engagement between the small diameter protective tube and the large diameter protective tube can be adjusted in accordance with the relative rotation angle.

(7) The protective tube attaching method according to the aforementioned configuration (5) or (6), wherein the section deforming step is a winding step in which at least one of the small diameter protective tube and the large diameter protective tube which is extrusion-molded into a circular shape in section is wound on a take-up reel so that the circular section is pressed and deformed by a predetermined amount or more.

According to the protective tube attaching method having the aforementioned configuration (7), the non-circular sectional shape perpendicular to the tube axis for causing friction engagement between the large diameter protective tube and the small diameter protective tube can be obtained without provision of any special pressing and deformation mechanism etc. and at the same time as at least one of the small diameter protective tube and the large diameter protective tube is molded by extrusion.

(8) A protective tube attaching method according to the aforementioned configuration (4), further comprising:

a curved shape deforming step of forming at least one of the small diameter protective tube and the large diameter protective tube into a curved shape which is curved along a longitudinal direction thereof by a predetermined amount or more, wherein the curved shape deforming step is performed prior to the protective tube inserting step.

According to the protective tube attaching method having the aforementioned configuration (8), on the condition that the small diameter protective tube and the large diameter protective tube in the protective tube outer-fitted to the electric wires of the wire harness have been slid relatively to each other in a direction along the tube axis to be extended, an inner circumferential surface of the extended large diameter protective tube and the outer circumferential surface of the extended small diameter protective tube are brought into pressure contact with each other at least two places longitudinally separated from each other or the inserted electric wires are brought into pressure contact with an inner circumferential surface of the small diameter protective tube and the inner circumferential surface of the large diameter protective tube at least two places longitudinally separated from each other. Accordingly, the small diameter protective tube and the large diameter protective tube can be prevented from moving relatively to each other easily. Thus, after the opposite ends of the small diameter protective tube and the large diameter protective tube have been positioned at the one reference portion and the other reference portion, the small diameter protective tube and the large diameter protective tube in the protective tube can be restricted from being positionally displaced due to unexpected movement.

(9) A protective tube attaching method according to the aforementioned configuration (8), wherein the curved deforming step is a winding step in which at least one of the small diameter protective tube and the large diameter protective tube which is molded by extrusion is wound on a take-up reel so as to be deformed into a curved shape which is curved along a longitudinal direction thereof by a predetermined amount or more.

According to the protective tube attaching method having the aforementioned configuration (9), the curved shape which is curved along the longitudinal direction thereof so as to prevent the large diameter protective tube and the small diameter protective tube from moving relatively to each other easily can be obtained without provision of any special curved shape deformation mechanism etc. and at the same time as at least one of the small diameter protective tube and the large diameter protective tube is molded by extrusion.

According to the protective tube and the protective tube attaching method according to the invention, it is possible to easily perform electric wire protection work for protecting electric wires of a wire harness.

The invention has been described briefly above. When modes (hereinafter referred to as "embodiments") for carrying out the invention as will be described below are read through with reference to the accompanying drawings, details of the invention can be made further clear.

BRIEF DESCRIPTION OF THE DRAWINGS

FIGS. 1A to 1E are procedure explanatory views showing work of a protective tube attaching method according to an embodiment of the invention when the sectional shape of a large diameter protective tube perpendicular to its tube axis is non-circular.

DETAILED DESCRIPTION OF THE EXEMPLARY EMBODIMENTS

Embodiments according to the invention will be described below with reference to the drawings.

A protective tube 11 and an attaching method of the protective tube 11 according to an embodiment of the invention are preferably used, for example, for a wire harness 13 for a car.

Figure 7:
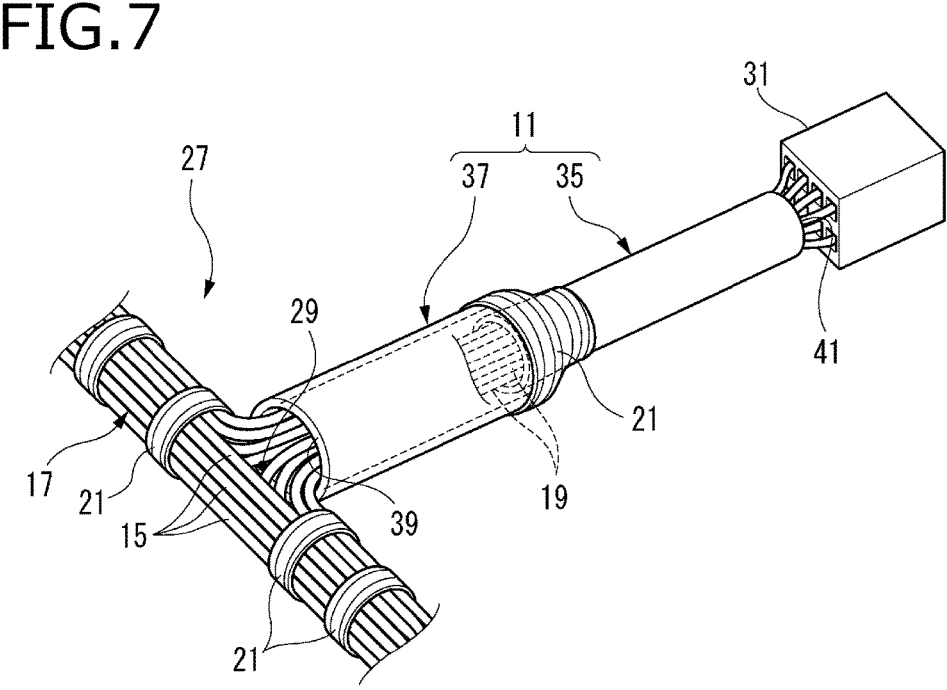
FIG. 7 is a perspective view of a main part of a wire harness covered with a protective tube when one reference portion in the wire harness is a divergence portion.
Figure 8A:
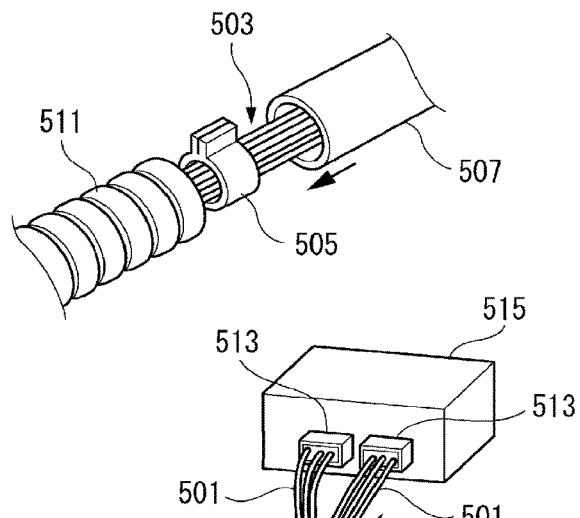
FIGS. 8A to 8C are procedure explanatory views showing manufacturing steps of a wire harness having a protective tube attachment structure of a background-art wire harness.
Figure 8B:
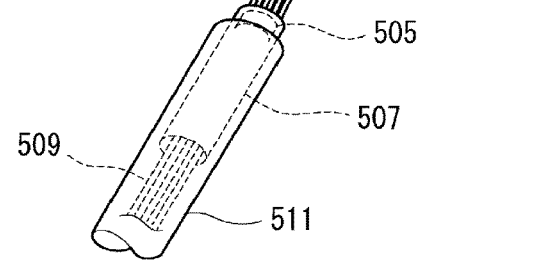
Figure 8C:
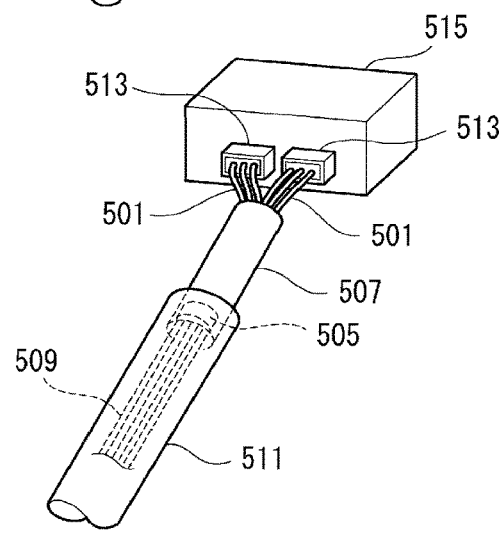
Figure 9A:
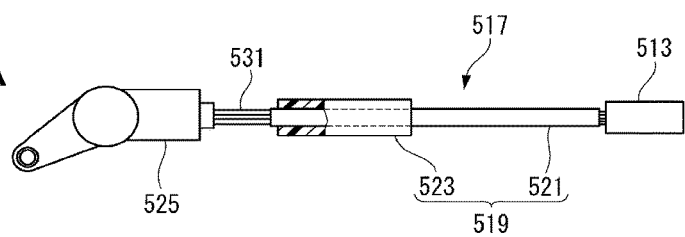
FIGS. 9A to 9C are procedure explanatory views showing manufacturing steps of a wire harness having a wire protecting device for use in a background-art automatic transmission.
Figure 9B:
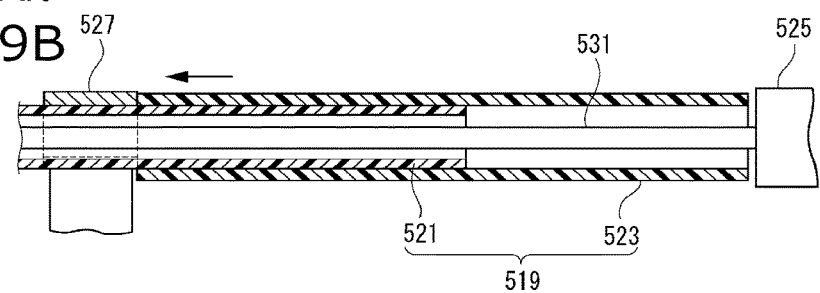
Figure 9C:
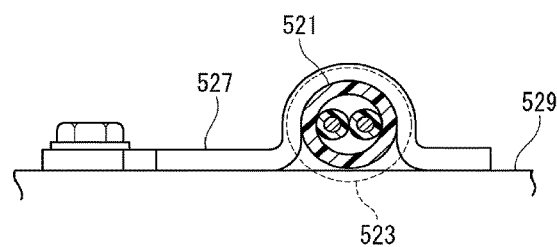

The wire harness 13 according to the embodiment has the following configuration. That is, predetermined electric wires 15 (branch lines 19 shown in FIG. 7) out of an electric wire bundle (trunk line 17 shown in FIG. 7) in which electric wires 15 are bundled are split, or a connector is connected to the trunk line 17 or the branch lines 19. An adhesive tape 21 is wound on the outer circumference of the trunk line 17 or the branch lines 19 at predetermined intervals so that the trunk line 17 or the branch lines 19 can be bundled so as to be prevented from coming loose.

Description will be made in the case where the wire harness 13 according to the embodiment shown in FIG. 1 only includes a trunk line by way of example. In the wire harness 13, a first connector 23 is attached to one ends of electric wires 15 and a second connector 25 is attached to the other ends of the electric wires 15. In the embodiment, the first connector 23 serves as one reference portion in the wire harness. The second connector 25 serves as the other reference portion in the wire harness. In addition thereto, the wire harness according to the embodiment may have a configuration like a wire harness 27 shown in FIG. 7, in which one reference portion in the wire harness serves as a divergence portion 29 and the other reference portion in the wire harness serves as a connector 31.

Terminal metal fittings 33 are mounted into a connector housing in each of the first connector 23 and the second connector 25 according to the embodiment. The terminal metal fittings 33 are connected to terminal ends of predetermined electric wires 15 of the wire harness 13 respectively. The terminal metal fittings 33 connected to the terminal ends of the electric wires 15 are inserted into terminal receiving chambers inside the connector housing in the first connector 23 or the second connector 25. The terminal metal fittings 33 are locked to not-shown lances provided in the terminal receiving chambers so as to be restricted from coming off.

The protective tube 11 is put on (outer-fitted to) the outer circumferences of the electric wires 15 of the wire harness 13. That is, the electric wires 15 of the wire harness 13 are inserted into the protective tube 11. The protective tube 11 is outer-fitted to the wire harness 13 before one of the connectors (the second connector 25 in the embodiment) is attached to the wire harness 13. The protective tube 11 can be outer-fitted to the electric wires 15 in the state in which the terminal metal fittings 33 have been attached to the terminal ends of the electric wires 15.

The protective tube 11 protecting the electric wires 15 of the wire harness 13 has a small diameter protective tube 35 and a large diameter protective tube 37. The large diameter protective tube 37 is put on the small diameter protective tube 35 so as to be movable relatively thereto. More specifically, for example, the small diameter protective tube 35 is formed to have a diameter of about 6 mm and a length of about 60 mm. In addition, the large diameter protective tube 37 is formed to have a diameter of about 8 mm and a length of about 40 mm. For example, the small diameter protective tube 35 and the large diameter protective tube 37 can be made of PVC (polyvinyl chloride).

The attaching method of the protective tube 11 according to the embodiment includes a protective tube inserting step, a large diameter protective tube positioning step, a small diameter protective tube positioning step, and a protective tube fixing step. In the protective tube inserting step, the electric wires 15 are inserted through the small diameter protective tube 35 and the large diameter protective tube 37 which is put on the small diameter protective tube 35 so as to be movable relatively thereto and which is shorter than the small diameter protective tube 35. In the large diameter protective tube positioning step, one end portion 39 of the large diameter protective tube 37 is positioned at one reference portion of the wire harness 13. In the small diameter protective tube positioning step, the small diameter protective tube 35 is moved relatively to the large diameter protective tube 37 which has been positioned at the one reference portion, so that the other end portion 41 of the small diameter protective tube 35 can be positioned at the other reference portion of the wire harness 13. In the protective tube fixing step, the other end portion 43 of the large diameter protective tube 37 is fixed to overlap with an outer circumferential surface of the small diameter protective tube 35.

In the protective tube inserting step according to the embodiment, onto the electric wires 15 of the wire harness 13 to which the first connector 23 is connected on one end side thereof, the large diameter protective tube 37 and the small diameter protective tube 35 are outer-fitted from the other end side, as shown in FIG. 1A.

As shown in FIG. 1B, of the large diameter protective tube 37 and the small diameter protective tube 35 outer-fitted to the electric wires 15 of the wire harness 13, the one end portion 39 of the large diameter protective tube 37 is first brought toward the first connector 23. In this manner, the large diameter protective tube positioning step of positioning the one end portion 39 of the large diameter protective tube 37 at the first connector 23 serving as the one reference portion of the wire harness 13 is completed. Then, as shown in FIG. 1C, the terminal metal fittings 33 connected to the other ends of the electric wires 15 are inserted into the terminal receiving chambers inside the connector housing of the second connector 25 respectively. Thus, the second connector 25 is attached to the other ends of the electric wires 15.

Next, while the large diameter protective tube 37 is held by one hand of a worker, the small diameter protective tube 35 is moved (pulled out rightward in FIG. 1D) relatively to the large diameter protective tube 37 as shown in FIG. 1D so that the other end portion 41 of the small diameter protective tube 35 can be brought toward the second connector 25. In this manner, the small diameter protective tube positioning step of positioning the other end portion 41 of the small diameter protective tube 35 at the second connector 25 serving as the other reference portion of the wire harness 13 is completed. On this occasion, the small diameter protective tube 35 and the large diameter protective tube 37 are frictionally engaged with each other as described above. Accordingly, the small diameter protective tube 35 and the large diameter protective tube 37 are retained to be restricted from moving longitudinally relatively to each other.

Finally, the adhesive tape 21 is wound on the outer circumferential surface of a part where the other end portion 43 of the large diameter protective tube 37 from which the small diameter protective tube 35 has been pulled out overlaps with the small diameter protective tube 35. Thus, the protective tube fixing step is completed. The large diameter protective tube 37 and the small diameter protective tube 35 which have been extended are fixed by the adhesive tape 21 so that the protective tube 11 can be kept at a fixed length. As a result, the connector underhead part of the first connector 23 and the connector underhead part of the second connector 25 are covered with the protective tube 11 securely.

In addition, the attaching method of the protective tube 11 according to the embodiment preferably includes a section deforming step prior to the aforementioned protective tube inserting step. In the section deforming step, of one of the small diameter protective tube 35 and the large diameter protective tube 37, the sectional shape (cross sectional shape) perpendicular to its tube axis is formed into a nearly elliptical shape (non-circular shape) which has a circular section pressed and deformed by at least a predetermined amount so that the small diameter protective tube 35 and the large diameter protective tube 37 can be frictionally engaged with each other, as shown in FIGS. 2A and 2B.

Figure 2A:
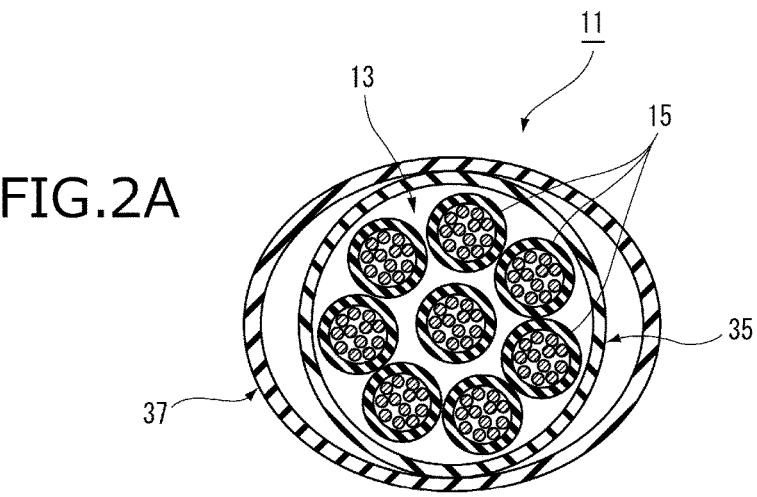
FIG. 2A is a view of a section of a wire harness covered with a protective tube, which section is perpendicular to its tube axis, when the sectional shape of a large diameter protective tube perpendicular to the tube axis is non-circular.
Figure 2B:
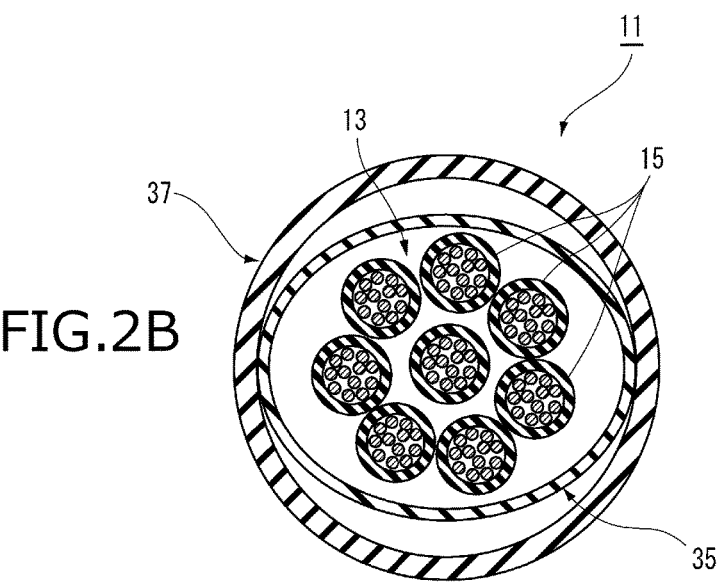
FIG. 2B is a view of a section of a wire harness covered with a protective tube, which section is perpendicular to its tube axis, when the sectional shape of a small diameter protective tube perpendicular to the tube axis is non-circular.

That is, in the protective tube 11 shown in FIG. 2A, the large diameter protective tube 37 is formed into a nearly elliptical shape in section. Thus, a part of the inner circumferential surface of the large diameter protective tube 37 makes elastic contact with the outer circumferential surface of the cylinder of the small diameter protective tube 35 so as to be frictionally engaged therewith. On the other hand, in the protective tube 11 shown in FIG. 2B, the small diameter protective tube 35 is formed into a nearly elliptical shape in section. Thus, a part of the outer circumferential surface of the small diameter protective tube 35 makes elastic contact with the inner circumferential surface of the cylinder of the large diameter protective tube 37 so as to be frictionally engaged therewith.

Figure 3A:
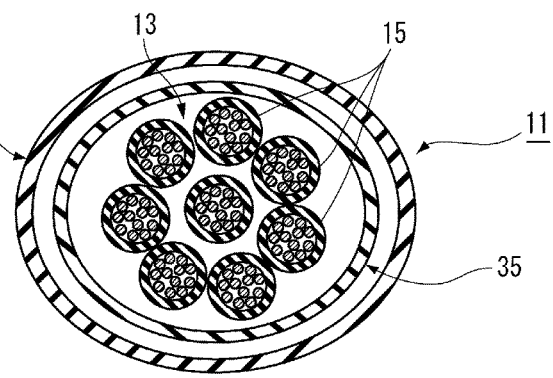
FIG. 3A is a view of a section of a wire harness covered with a protective tube prior to friction engagement, which section is perpendicular to its tube axis, when the sectional shapes of a large diameter protective tube and a small diameter protective tube perpendicular to the tube axis are non-circular.
Figure 3B:
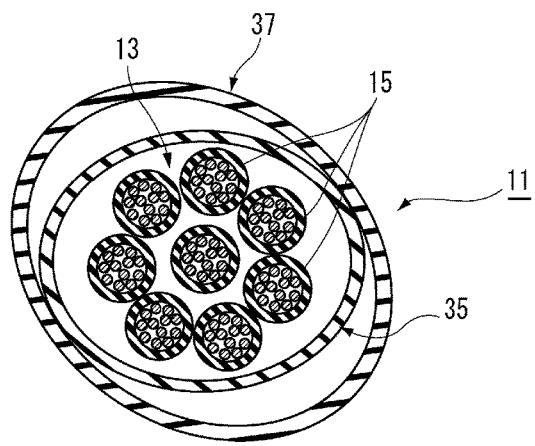
FIG. 3B is a view of a section of the protective tube in FIG. 3A perpendicular to the tube axis in the middle of friction engagement.
Figure 3C:
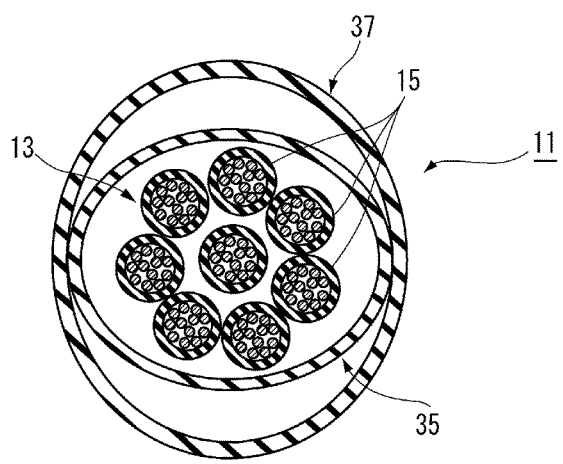
FIG. 3C is a view of a section of the protective tube in FIG. 3B perpendicular to the tube axis after friction engagement.

Further, as shown in FIGS. 3A to 3C, of both the small diameter protective tube 35 and the large diameter protective tube 37, the sectional shapes perpendicular to the tube axis may be formed into nearly elliptical shapes (non-circular shapes). On this occasion, a friction engagement step of rotating the small diameter protective tube 35 and the large diameter protective tube 37 relatively to each other with a predetermined angle around the tube axis is provided prior to the protective tube fixing step. Thus, the small diameter protective tube 35 and the large diameter protective tube 37 are rotated relatively to each other around the tube axis suitably, as shown in FIGS. 3B and 3C. Accordingly, normal force generated between the outer circumferential surface of the small diameter protective tube 35 and the inner circumferential surface of the large diameter protective tube 37 which make elastic contact with each other changes, so that retention force generated due to friction engagement can be adjusted in accordance with the relative rotation angle. Due to such friction engagement, the small diameter protective tube 35 and the large diameter protective tube 37 in the protective tube 11 can be prevented from moving relatively to each other easily. Thus, the small diameter protective tube 35 and the large diameter protective tube 37 are restricted from moving in a direction along the tube axis so that the small diameter protective tube 35 and the large diameter protective tube 37 can be retained in their positioned states.

Figure 4A:
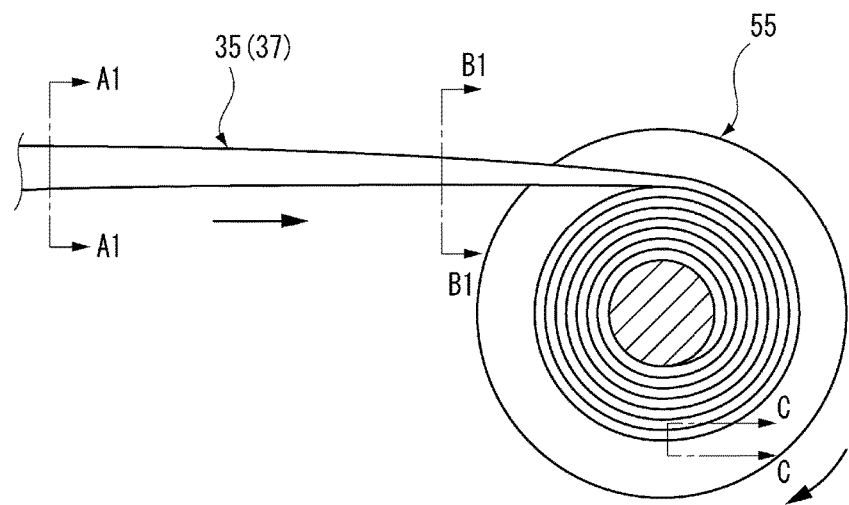
FIGS. 4A and 4B are schematic views showing a process of winding the protective tube on a take-up reel to press and deform the protective tube, FIG. 4A showing the process in which the protective tube extrusion-molded into a circular shape in section is wound on the take-up reel, FIG. 4B showing a process in which the protective tube wound on the take-up reel is pulled out.
Figure 5A:
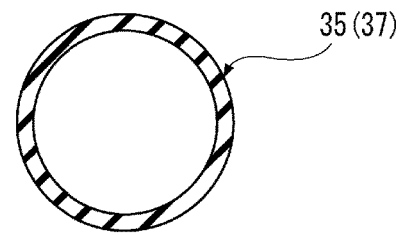
FIG. 5A is a sectional view taken along a line A1-A1 in FIG. 4A.
Figure 5B:
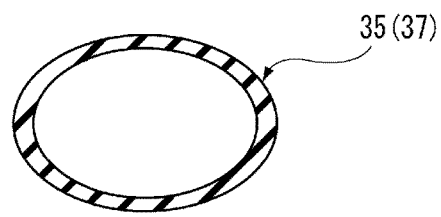
FIG. 5B is a sectional view taken along a line B1-B1 in FIG. 4A.
Figure 5C:
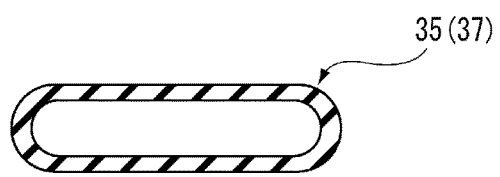
FIG. 5C is a sectional view taken along a line C-C in FIG. 4A.

The aforementioned section deforming step can be set as a winding step in which the small diameter protective tube 35 (or the large diameter protective tube 37) extrusion-molded into a circular shape in section is wound on a take-up reel 55, for example, as shown in FIG. 4A, so as to have a circular section pressed and deformed by at least a predetermined amount. That is, the sectional shape of the extrusion-molded small diameter protective tube 35 (or large diameter protective tube 37) immediately after a die outlet is elastically deformed from a perfect circle shown in FIG. 5A into a nearly ellipse shown in FIG. 5B and further wound on the take-up reel 55. Thus, the small diameter protective tube 35 (or the large diameter protective tube 37) is elastically deformed into a flat oval shape shown in FIG. 5C.

Figure 4B:
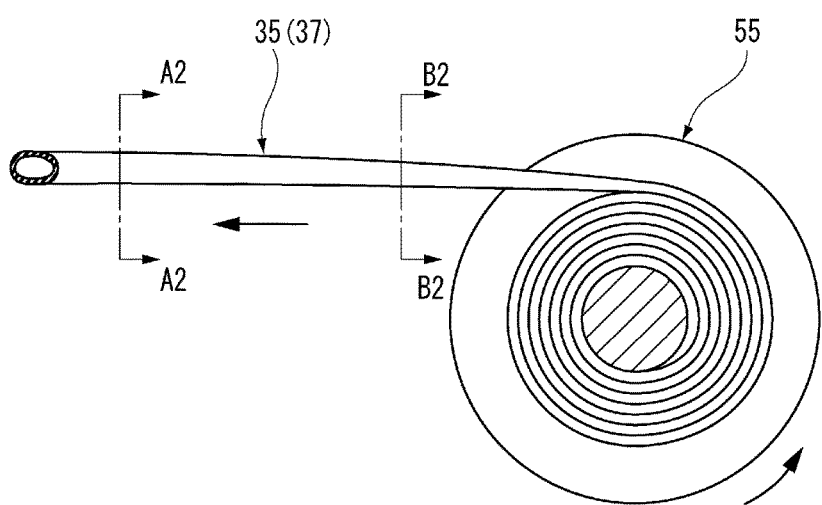
Figure 5D:
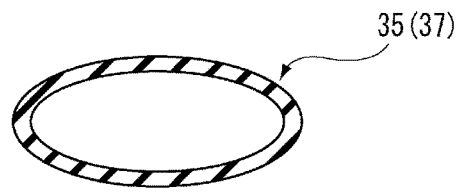
FIG. 5D is a sectional view taken along a line B2-B2 in FIG. 4B.
Figure 5E:
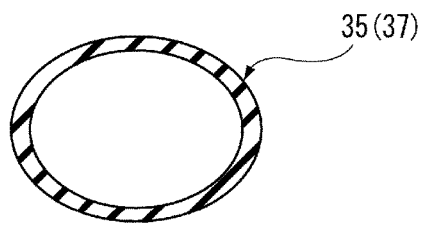
FIG. 5E is a sectional view taken along a line A2-A2 in FIG. 4B.

The small diameter protective tube 35 (or the large diameter protective tube 37) wound on the take-up reel 55 is conveyed to a manufacturing line of the wire harness 13, pulled out from the take-up reel 55, and cut into a predetermined length, as shown in FIG. 4B. Then, the small diameter protective tube 35 (or large diameter protective tube 37) is put on the electric wires 15. Here, the sectional shape of the small diameter protective tube 35 (or the large diameter protective tube 37) pulled out from the take-up reel 55 is elastically restored from a flat nearly ellipse shown in FIG. 5D to a nearly ellipse shown in FIG. 5E immediately after the pulling-out from the reel. However, due to the plastic deformation generated when the small diameter protective tube 35 (or the large diameter protective tube 37) is wound, the small diameter protective tube 35 (or the large diameter protective tube 37) cannot return to the perfect circle shown in FIG. 5A.

Accordingly, since the small diameter protective tube 35 (or the large diameter protective tube 37) is wound on the take-up reel 55 and conveyed, the sectional shape of the small diameter protective tube 35 (or the large diameter protective tube 37) perpendicular to the tube axis is formed into the nearly elliptical shape (non-circular shape) which has a circular section pressed and deformed by at least the predetermined amount. It is a matter of course that, of one of the small diameter protective tube 35 and the large diameter protective tube 37, the sectional shape perpendicular to the tube axis may be formed into a nearly elliptical shape (non-circular shape) by another method.

Next, an effect of the protective tube 11 having the aforementioned configuration will be described.

In the aforementioned protective tube 11 according to the embodiment, the small diameter protective tube 35 and the large diameter protective tube 37 are put on (outer-fitted to) the outer circumferential sides of the electric wires 15 of the wire harness 13, as shown in FIG. 1B. The first connector 23 on one end side of the electric wires 15 of the wire harness 13 to which the small diameter protective tube 35 and the large diameter protective tube 37 are outer-fitted serves as one reference portion, and the second connector 25 on the other end side of the electric wires 15 of the wire harness 13 serves as the other reference portion. In the case of the embodiment in which connectors are disposed on the opposite end sides, the small diameter protective tube 35 and the large diameter protective tube 37 are outer-fitted from the other end side of the electric wires 15 to which the first connector 23 has been attached. The second connector 25 is then attached to the other end side of the electric wires 15 to which the small diameter protective tube 35 and the large diameter protective tube 37 have been outer-fitted, as shown in FIG. 1C.

In the protective tube 11 outer-fitted to the electric wires 15 of the wire harness 13, the small diameter protective tube 35 and the large diameter protective tube 37 are moved (slid) relatively to each other in the direction to extend. The sectional shape of the large diameter protective tube 37 perpendicular to the tube axis is formed into the nearly elliptical shape (non-circular shape) which has the circular section pressed and deformed by at least the predetermined amount. Thus, the small diameter protective tube 35 and the large diameter protective tube 37 are frictionally engaged with each other. As shown in FIG. 1D, the small diameter protective tube 35 and the large diameter protective tube 37 in the extended protective tube 11 are restricted from moving longitudinally relatively to each other, and retained so that the opposite ends of the small diameter protective tube 35 and the large diameter protective tube 37 can be positioned at the first connector 23 and the second connector 25. Thus, it is possible to shift rapidly to the step of fixing the small diameter protective tube 35 and the large diameter protective tube 37 and it is possible to easily perform electric wire protection work for protecting the electric wires 15 of the wire harness 13.

According to the protective tube 11 in which the sectional shapes of both the small diameter protective tube 35 and the large diameter protective tube 37 perpendicular to the tube axis as shown in FIGS. 3A to 3C are formed as the elliptical shapes (non-circular shapes), retention force generated due to friction engagement between the small diameter protective tube 35 and the large diameter protective tube 37 can be adjusted in accordance with the relative rotation angle between the small diameter protective tube 35 and the large diameter protective tube 37 around the tube axis.

Next, an effect of the attaching method of the protective tube 11 having the aforementioned configuration will be described.

In the aforementioned attaching method of the protective tube 11 according to the embodiment, the protective tube 11 protecting the electric wires 15 of the wire harness 13 includes the small diameter protective tube 35 and the large diameter protective tube 37. The large diameter protective tube 37 is put on the small diameter protective tube 35 so as to be movable (slidable) relatively thereto. Further, the large diameter protective tube 37 is shorter in length in the tube axis direction than the small diameter protective tube 35.

Both the small diameter protective tube 35 and the large diameter protective tube 37 are put on (outer-fitted to) the outer circumferential sides of the electric wires 15 of the wire harness 13. Incidentally, the small diameter protective tube 35 and the large diameter protective tube 37 may be outer-fitted to the electric wires 15 of the wire harness 13 simultaneously or separately. In consideration of working efficiency on this occasion, it is however desirable that the large diameter protective tube 37 outer-fitted to the small diameter protective tube 35 is outer-fitted to the electric wires 15 of the wire harness 13 simultaneously.

The small diameter protective tube 35 to which the large diameter protective tube 37 is outer-fitted is longer in length in the tube axis direction than the large diameter protective tube 37. Accordingly, an exposed part not covered with the large diameter protective tube 37 is always present in the small diameter protective tube 35. Thus, the small diameter protective tube 35 is covered with the large diameter protective tube 37 but can be pulled out.

According to the attaching method of the protective tube 11 according to the embodiment, of the small diameter protective tube 35 and the large diameter protective tube 37 which have been put on (outer-fitted to) the outer circumferential sides of the electric wires 15 of the wire harness 13, first, the one end portion 39 of the large diameter protective tube 37 is positioned to abut against the first connector 23 serving as the one reference portion of the wire harness 13. Thus, it is possible to perform initial positioning work easily when the small diameter protective tube 35 and the large diameter protective tube 37 are outer-fitted to the electric wires 15. It is because the large diameter protective tube 37 is larger in diameter and smaller in contact friction during sliding against the electric wires 15 of the wire harness 13 than the small diameter protective tube 35.

Then, while the large diameter protective tube 37 is held by one hand of the worker, the exposed part of the small diameter protective tube 35 is held by the other hand and moved (pulled out) relatively to the large diameter protective tube 37 so as to be positioned at the second connector 25 serving as the other reference portion of the wire harness 13. On this occasion, the small diameter protective tube 35 is longer in length and larger in contact friction against the electric wires 15 of the wire harness 13 than the large diameter protective tube 37. Accordingly, after the small diameter protective tube 35 has been positioned at the second connector 25, the small diameter protective tube 35 can be prevented from moving unexpectedly easily. That is, positioning work can be performed easily. Incidentally, since the large diameter protective tube 37 is held by one hand of the worker, the large diameter protective tube 37 can be prevented from being positionally displaced. As a result, it is possible to shift to the protective tube fixing step immediately.

Thus, according to the attaching method of the protective tube 11 having the configuration, it is possible to rapidly position the large diameter protective tube 37 at the same time as the small diameter protective tube 35 and the large diameter protective tube 37 are outer-fitted to the electric wires 15 of the wire harness 13. In addition thereto, it is possible to prevent the small diameter protective tube 35 from being positionally displaced easily and it is possible to shift rapidly to the protective tube fixing step.

On the other hand, assume that the small diameter protective tube 35 is first positioned at the first connector 23 serving as one reference portion of the wire harness 13. In this case, friction resistance of the small diameter protective tube 35 against the electric wires 15 is large to thereby make it difficult to perform positioning work at an initial stage of the outer-fitting. Then, relatively to the positioned small diameter protective tube 35, the large diameter protective tube 37 is slid to be positioned at the second connector 25 serving as the other reference portion. However, the large diameter protective tube 37 has lower friction against the electric wires 15 than the small diameter protective tube 35. Accordingly, it is difficult to keep the large diameter protective tube 37 at the positioned position, and it is difficult to perform fixing work.

As a result, according to the attaching method of the protective tube 11 having the configuration, electric wire protection work becomes excellent when the small diameter protective tube 35 and the large diameter protective tube 37 outer-fitted to the electric wires 15 of the wire harness 13 are slid relatively to each other in the direction along the axis to be extended so that the opposite ends of the small diameter protective tube 35 and the large diameter protective tube 37 can be positioned at the first connector 23 and the second connector 25 in the wire harness 13.

In addition, the aforementioned attaching method of the protective tube 11 according to the embodiment includes the section deforming step in which, of at least one of the small diameter protective tube 35 and the large diameter protective tube 37, the sectional shape perpendicular to the tube axis is formed into the nearly ellipse (non-circular shape) which has a circular section pressed and deformed by at least the predetermined amount. Accordingly, on the condition that the small diameter protective tube 35 and the large diameter protective tube 37 in the protective tube 11 outer-fitted to the electric wires 15 of the wire harness 13 have been slid relatively to each other in the direction along the tube axis so as to be extended, the large diameter protective tube 37 and the small diameter protective tube 35 which have been extended are frictionally engaged with each other so as to be prevented from moving relatively to each other easily. Thus, after the opposite ends of the small diameter protective tube 35 and the large diameter protective tube 37 have been positioned at the first connector 23 and the second connector 25 in the wire harness 13, the small diameter protective tube 35 and the large diameter protective tube 37 in the protective tube 11 can be restricted from being positionally displaced from each other due to unexpected movement.

Further, according to the attaching method of the protective tube 11 in which the sectional shapes of both the small diameter protective tube 35 and the large diameter protective tube 37 perpendicular to the tube axis are formed into nearly elliptical shapes (non-circular shapes), retention force generated due to friction engagement between the small diameter protective tube 35 and the large diameter protective tube 37 can be adjusted in accordance with a rotation angle with which the small diameter protective tube 35 and the large diameter protective tube 37 are rotated relatively to each other around the tube axis.

Further, the attaching method of the protective tube 11 according to the embodiment includes the winding step in which the small diameter protective tube 35 (or the large diameter protective tube 37) extrusion-molded into a circular shape in section is wound up by use of the take-up reel 55. Thus, the nearly elliptical shape (non-circular shape) of the section which is perpendicular to the tube axis and which may cause friction engagement between the large diameter protective tube 37 and the small diameter protective tube 35 can be obtained without provision of any special pressing and deformation mechanism etc. and at the same time as the small diameter protective tube 35 (or the large diameter protective tube 37) is molded by extrusion.

Further, as shown in FIGS. 6A to 6D, in a protective tube 47 according to another embodiment of the invention, for example, a small diameter protective tube 45 is formed into a curved shape which is curved longitudinally by at least a predetermined amount. Accordingly, when a large diameter protective tube 37 is put on the small diameter protective tube 45, an outer circumferential surface of the small diameter protective tube 45 makes pressure contact with an inner circumferential surface of the large diameter protective tube 37 at least two places longitudinally separated from each other. Thus, the small diameter protective tube 45 and the large diameter protective tube 37 are frictionally engaged with each other.

In addition, electric wires 15 which have been inserted through the protective tube 47 make pressure contact with an inner circumferential surface of the small diameter protective tube 45 and the inner circumferential surface of the large diameter protective tube 37 at least two places longitudinally separated from each other. Thus, the electric wires 15 are also frictionally engaged with the small diameter protective tube 45 and the large diameter protective tube 37. In this case, of each of the small diameter protective tube 45 and the large diameter protective tube 37, the section perpendicular to its tube axis may be shaped like a perfect circle or may be shaped like a non-circle.

Incidentally, it will go well as long as at least one of the small diameter protective tube 45 and the large diameter protective tube 37 in the protective tube 47 according to the other embodiment as shown in FIGS. 6A to 6D is formed into a curved shape curved longitudinally by at least a predetermined amount. That is, this includes a case where the small diameter protective tube 45 is shaped like a curved line and the large diameter protective tube 37 is shaped like a straight line, a case where the small diameter protective tube 45 is shaped like a straight line and the large diameter protective tube 37 is shaped like a curved line, and a case where both the small diameter protective tube 45 and the large diameter protective tube 37 are shaped like curved lines. In the protective tube 47 shown in FIG. 6A, the small diameter protective tube 45 is formed into a curved shape and the large diameter protective tube 37 is formed into a straight linear shape.

When, for example, the extrusion-molded small diameter protective tube 45 is wound on a take-up reel 55, the curved shape of the aforementioned small diameter protective tube 45 curved longitudinally by at least a predetermined amount is deformed and formed (see FIG. 4A).

That is, after the small diameter protective tube 45 which has been extrusion-molded and wound on the take-up reel 55 is conveyed to a manufacturing line of a wire harness 13, pulled out from the take-up reel 55 and cut into a predetermined length, the small diameter protective tube 45 is put on the electric wires 15 (see FIG. 4B). Here, the small diameter protective tube 45 pulled out from the take-up reel 55 cannot return to a straight linear shape due to plastic deformation generated when the small diameter protective tube 45 is wound.

Accordingly, since the small diameter protective tube 45 is wound on the take-up reel 55 and conveyed, the small diameter protective tube 45 is formed into the curved shape curved longitudinally by at least the predetermined amount. It is a matter of course that at least one of the small diameter protective tube 45 and the large diameter protective tube 37 may be curved longitudinally by at least a predetermined amount to be formed into a curved shape by another method.

In addition, the attaching method of the protective tube 47 according to the other embodiment of the invention as shown in FIGS. 6A to 6D includes a curved line deforming step prior to a protection tube inserting step. In the curved line deforming step, for example, the small diameter protective tube 45 is formed into the curved shape curved longitudinally by at least the predetermined amount so that the small diameter protective tube 45, the large diameter protective tube 37 and the electric wires 15 can be frictionally engaged with one another. Therefore, on the condition that the small diameter protective tube 45 and the large diameter protective tube 37 in the protective tube 47 outer-fitted to the electric wires 15 of the wire harness 13 have been slid relatively to each other in the direction along the tube axis so as to be extended, the inner circumferential surface of the extended large diameter protective tube 37 and an outer circumferential surface of the extended small diameter protective tube 45 make pressure contact with each other at least two places longitudinally separated from each other. Thus, the small diameter protective tube 45 and the large diameter protective tube 37 are frictionally engaged with each other. In addition, the inserted electric wires 15 make pressure contact with the inner circumferential surface of the small diameter protective tube 45 and the inner circumferential surface of the large diameter protective tube 37 at least two places longitudinally separated from each other. Thus, the electric wires 15 are also frictionally engaged with the small diameter protective tube 45 and the large diameter protective tube 37. In this case, of each of the small diameter protective tube 45 and the large diameter protective tube 37, the section perpendicular to the tube axis may be shaped like a perfect circle or may be shaped like a non-circle.

Incidentally, in the protective tube 47 according to the other embodiment as shown in FIGS. 6A to 6D, it will go well as long as at least one of the small diameter protective tube 45 and the large diameter protective tube 37 is formed into a curved shape curved longitudinally by at least a predetermined amount. That is, this includes a case where the small diameter protective tube 45 is shaped like a curved line and the large diameter protective tube 37 is shaped like a straight line, a case where the small diameter protective tube 45 is shaped like a straight line and the large diameter protective tube 37 is shaped like a curved line, and a case where both the small diameter protective tube 45 and the large diameter protective tube 37 are shaped like curved lines. In the protective tube 47 shown in FIG. 6A, the small diameter protective tube 45 is formed into a curved shape and the large diameter protective tube 37 is formed into a straight linear shape.

The aforementioned curved line deforming step can be set as a winding step in which, for example, the extrusion-molded small diameter protective tube 45 is wound on the take-up reel 55 so as to be deformed into the curved shape which is curved longitudinally by at least the predetermined amount (see FIG. 4A). That is, after the small diameter protective tube 45 which has been extrusion-molded and wound on the take-up reel 55 is conveyed to the manufacturing line of the wire harness 13, pulled out from the take-up reel 55 and cut into a predetermined length, the small diameter protective tube 45 is put on the electric wires 15 (see FIG. 4B). Here, the small diameter protective tube 45 pulled out from the take-up reel 55 cannot return to a straight linear shape due to plastic deformation generated when the small diameter protective tube 45 is wound.

Accordingly, since the small diameter protective tube 45 is wound on the take-up reel 55 and conveyed, the small diameter protective tube 45 is formed into the curved shape curved longitudinally by at least the predetermined amount. It is a matter of course that at least one of the small diameter protective tube and the large diameter protective tube may be formed into a curved shape curved longitudinally by at least a predetermined amount by another method.

Next, an attaching method of the aforementioned protective tube 47 will be described.

The attaching method of the protective tube 47 according to the embodiment includes a curved line deforming step, a protective tube inserting step, a large diameter protective tube positioning step, a small diameter protective tube positioning step, and a protective tube fixing step. In the curved line deforming step, the small diameter protective tube 45 is formed into the curved shape curved longitudinally by at least the predetermined amount. In the protective tube inserting step, the electric wires 15 are inserted through the small diameter protective tube 45 and the large diameter protective tube 37 which is put on the small diameter protective tube 45 so as to be movable relatively thereto and which is shorter than the small diameter protective tube 45. In the large diameter protective tube positioning step, one end portion 39 of the large diameter protective tube 37 is positioned at one reference portion (the first connector 23) of the wire harness 13. In the small diameter protective tube positioning step, the small diameter protective tube 35 is moved relatively to the large diameter protective tube 37 positioned at the one reference portion, so that the other end portion 41 of the small diameter protective tube 35 can be positioned at the other reference portion (the second connector 25) of the wire harness 13. In the protective tube fixing step, the other end portion 43 of the large diameter protective tube 37 is fixed to overlap with the outer circumferential surface of the small diameter protective tube 45.

Figure 6A:
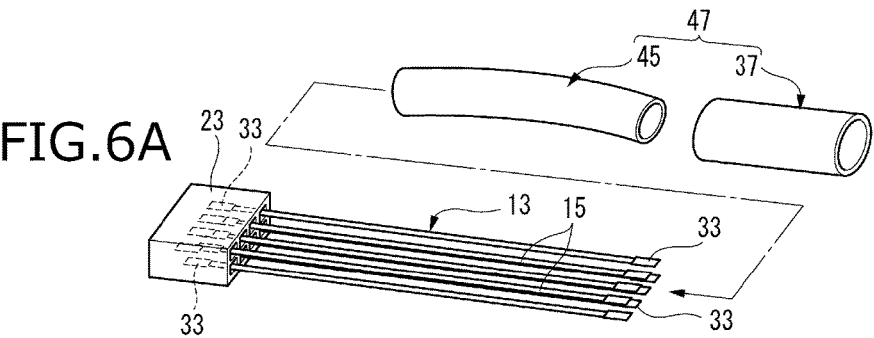
FIGS. 6A to 6D are procedure explanatory views showing protective tube attachment work according to another embodiment in which a small diameter protective tube is formed into a curved shape.

More specifically, in the protective tube inserting step, onto the electric wires 15 of the wire harness 13 to which the first connector 23 is connected on one end side thereof, the large diameter protective tube 37 and the small diameter protective tube 45 are outer-fitted from the other end side, as shown in FIG. 6A.

Figure 6B:
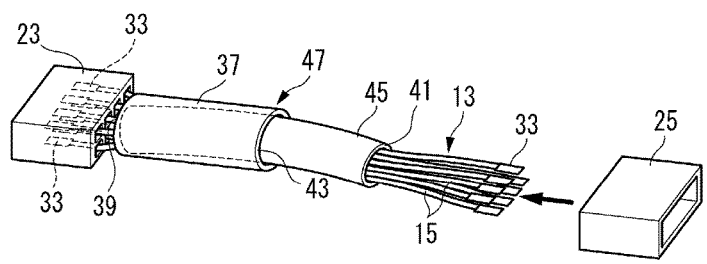

Terminal metal terminals 33 connected to the other ends of the electric wires 15 are inserted into terminal receiving chambers inside a connector housing of the second connector 25 respectively so that the second connector 25 is attached to the other ends of the electric wires 15, as shown in FIG. 6B.

Figure 6C:
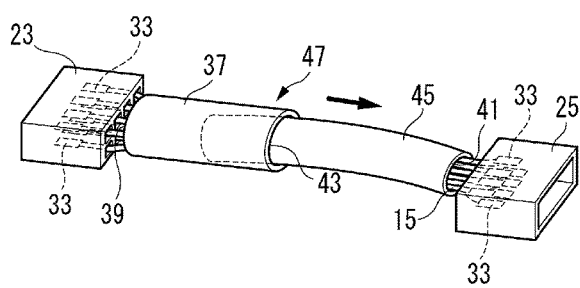

Then, of the large diameter protective tube 37 and the small diameter protective tube 45 outer-fitted to the electric wires 15 of the wire harness 13, the one end portion 39 of the large diameter protective tube 37 is first brought toward the first connector 23, as shown in FIG. 6C. In this manner, the large diameter protective tube positioning step of positioning the one end portion 39 of the large diameter protective tube 37 at the first connector 23 serving as the one reference portion of the wire harness 13 is completed.

Next, while the large diameter protective tube 37 is held by one hand of a worker, the small diameter protective tube 45 is moved (pulled out rightward in FIG. 6C) relatively to the large diameter protective tube 37 so that the other end portion 41 of the small diameter protective tube 45 can be brought toward the second connector 25, as shown in FIG. 6C. In this manner, the small diameter protective tube positioning step of positioning the other end portion 41 of the small diameter protective tube 45 at the second connector 25 serving as the other reference portion of the wire harness 13 is completed. On this occasion, the small diameter protective tube 45, the large diameter protective tube 37 and the electric wires 15 are frictionally engaged with one another, as described above. Therefore, the small diameter protective tube 45, the large diameter protective tube 37 and the electric wires 15 are retained to be restricted from moving longitudinally relatively to one another.

Figure 6D:
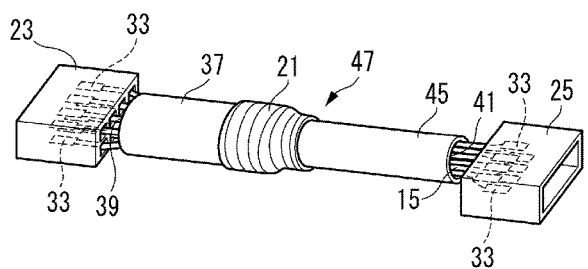

Finally, an adhesive tape 21 is wound on the outer circumferential surface of a part where the other end portion 43 of the large diameter protective tube 37 from which the small diameter protective tube 45 has been pulled out overlaps with the small diameter protective tube 45, as shown in FIG. 6D. Thus, the protective tube fixing step is completed. The large diameter protective tube 37 and the small diameter protective tube 45 which have been extended are fixed by the adhesive tape 21 so that the protective tube 47 can be kept at a fixed length. As a result, the connector underhead part of the first connector 23 and the connector underhead part of the second connector 25 are covered with the protective tube 47 securely.

An effect of the protective tube 47 having the aforementioned configuration will be described.

According to the aforementioned protective tube 47 according to the other embodiment, when the large diameter protective tube 37 is put on the small diameter protective tube 45 as shown in FIG. 6B, the outer circumferential surface of the small diameter protective tube 45 makes pressure contact with the inner circumferential surface of the large diameter protective tube 37 at least two places longitudinally separated from each other. Thus, the small diameter protective tube 45 and the large diameter protective tube 37 are frictionally engaged with each other. In addition, since the small diameter protective tube 45 is formed into the curved shape, the inserted electric wires 15 make pressure contact with the inner circumferential surface of the small diameter protective tube 45 and the inner circumferential surface of the large diameter protective tube 37 at least two places longitudinally separated from each other. Thus, the electric wires 15 are also frictionally engaged with the small diameter protective tube 45 and the large diameter protective tube 37. Due to such friction engagement, the small diameter protective tube 45 and the large diameter protective tube 37 in the extended protective tube 47 are restricted from moving longitudinally relatively to each other, and retained so that the opposite ends of the small diameter protective tube 45 and the large diameter protective tube 37 can be positioned at the first connector 23 serving as the one reference portion and the second connector serving as the other reference portion, as shown in FIG. 6C. In this manner, it is possible to shift rapidly to the step of fixing the small diameter protective tube 45 and the large diameter protective tube 37 and it is possible to easily perform electric wire protection work for protecting the electric wires 15 of the wire harness 13.

Here, the aforementioned characteristics of the embodiments of the protective tube and the protective tube attaching method according to the invention will be summarized and listed briefly respectively in the following paragraphs.

[1] A protective tube 11 for protecting an electric wire 15 of a wire harness 13, comprising:

a small diameter protective tube 35; and a large diameter protective tube 37 configured to cover the small diameter protective tube 35 so as to be movable relatively thereto, wherein a sectional shape perpendicular to its tube axis of at least one of the small diameter protective tube 35 and the large diameter protective tube 37 is formed into a non-circular shape which is obtained by pressing and deforming its circular cross-section by a predetermined amount or more, and the small diameter protective tube 35 and the large diameter protective tube 37 which are configured to be moved along a longitudinal direction thereof relatively to each other are frictionally engaged with each other.

[2] The protective tube 11 according to the aforementioned paragraph [1], wherein the sectional shape perpendicular to the tube axis of each of the small diameter protective tube 35 and the large diameter protective tube 37 is formed into the non-circular shape which is obtained by pressing and deforming its circular cross-section by a predetermined amount or more.

[3] A protective tube for protecting an electric wire 15 of a wire harness 13, comprising:

a small diameter protective tube 45; and a large diameter protective tube 37 configured to cover the small diameter protective tube 45 so as to be movable relatively thereto, wherein at least one of the small diameter protective tube 45 and the large diameter protective tube 37 is formed into a curved shape which is curved along a longitudinal direction thereof by a predetermined amount or more, and the small diameter protective tube 45 and the large diameter protective tube 37 which are configured to be moved the longitudinal direction thereof relatively to each other are frictionally engaged with each other.

[4] A protective tube attaching method for protecting an electric wire 15 of a wire harness 13 by a protective tube 11 including a small diameter protective tube 35 and a large diameter protective tube 37, the large diameter protective tube 37 covering the small diameter protective tube 35 so as to be movable relatively thereto, the protective tube attaching method comprising:

a protective tube inserting step of inserting the electric wire 15 through the small diameter protective tube 35 and the large diameter protective tube 37 which covers the small diameter protective tube 35 so as to be movable relatively thereto and which is shorter than the small diameter protective tube 35;

a large diameter protective tube positioning step of positioning one end portion of the large diameter protective tube 37 at one reference portion (first connector 23) of the wire harness 13;

a small diameter protective tube positioning step of moving the small diameter protective tube 35 relatively to the large diameter protective tube 37 positioned at the one reference portion (first connector 23), to thereby position the other end portion of the small diameter protective tube 35 at the other reference portion (second connector 25) of the wire harness 13; and a protective tube fixing step of fixing the other end portion of the large diameter protective tube 37 in a state that the other end portion of the large diameter protective tube 37 overlaps with an outer circumferential surface of the small diameter protective tube 35.

[5] The protective tube attaching method according to the aforementioned paragraph [4], further comprising:

a section deforming step of forming the sectional shape perpendicular to its tube axis of at least one of the small diameter protective tube 35 and the large diameter protective tube 37 into a non-circular shape by pressing and deforming its circular cross-section by a predetermined amount or more, wherein the section deforming step is performed prior to the protective tube inserting step.

[6] The protective tube attaching method according to the aforementioned paragraph [5], further comprising:

a friction engagement step of rotating the small diameter protective tube 35 and the large diameter protective tube 37 relatively to each other with a predetermined angle around the tube axis when the sectional shape perpendicular to the tube axis of each of the small diameter protective tube 35 and the large diameter protective tube 37 is formed into a non-circular shape, wherein the friction engagement step is performed prior to the protective tube fixing step.

[7] The protective tube attaching method according to the aforementioned paragraph [5] or [6], wherein the section deforming step is a winding step in which at least one of the small diameter protective tube 35 and the large diameter protective tube 37 which is extrusion-molded into a circular shape in section is wound on a take-up reel 55 so that the circular section is pressed and deformed by a predetermined amount or more.

[8] The protective tube attaching method according to the aforementioned paragraph [4], further comprising:

a curved shape deforming step of forming at least one of the small diameter protective tube 45 and the large diameter protective tube 37 into a curved shape which is curved along a longitudinal direction thereof by a predetermined amount or more, wherein the curved shape deforming step is performed prior to the protective tube inserting step.

[9] The protective tube attaching method according to the aforementioned paragraph [8], wherein the curved deforming step is a winding step in which at least one of the small diameter protective tube 45 and the large diameter protective tube 37 which is molded by extrusion is wound on a take-up reel 55 so as to be deformed into a curved shape which is curved along a longitudinal direction thereof by a predetermined amount or more.

Accordingly, according to the protective tube 11, 47 and the attaching method of the protective tube 11, 47 according to the embodiment, it is possible to easily perform electric wire protection work for protecting the electric wires 15 of the wire harness 13.

Incidentally, the invention is not limited to the aforementioned embodiments but modification, improvement, etc. can be made on the invention suitably. In addition thereto, the materials, shapes, dimensions, numbers, arrangement places etc. of the respective constituent elements in each of the aforementioned embodiments are not limited but may be set desirably as long as they can achieve the invention.

According to the protective tube and the protective tube attaching method according to the invention, it is possible to easily perform electric wire protection work for protecting electric wires of a wire harness. Accordingly, the protective tube and the protective tube attaching method according to the invention are useful for a wire harness having a configuration in which predetermined electric wires in an electric wire bundle in which electric wires are bundled are split or connectors are connected to terminal ends of a trunk line or branch lines.

What is claimed is:

1. A protective tube attaching method for protecting an electric wire of a wire harness by a protective tube including a small diameter protective tube and a large diameter protective tube, the large diameter protective tube covering the small diameter protective tube so as to be movable relatively to the small diameter protective tube, each of the small diameter protective tube and the large diameter protective tube includes one end portion and an other end portion, and the wire harness includes one reference portion and an other reference portion, the protective tube attaching method comprising:

a protective tube inserting step of inserting the electric wire through the small diameter protective tube and the large diameter protective tube when the large diameter protective tube covers the small diameter protective tube such that the electric wire passes through each of the small diameter protective tube and the large diameter protective tube;

a large diameter protective tube positioning step of positioning the one end portion of the large diameter protective tube at the one reference portion of the wire harness;

a small diameter protective tube positioning step of moving the small diameter protective tube relatively to the large diameter protective tube positioned at the one reference portion of the wire harness, to thereby position the other end portion of the small diameter protective tube at the other reference portion of the wire harness; and a protective tube fixing step of fixing the other end portion of the large diameter protective tube in a state that the other end portion of the large diameter protective tube overlaps with an outer circumferential surface of the small diameter protective tube.

2. The protective tube attaching method according to claim 1, further comprising:

a section deforming step of forming a circular sectional shape perpendicular to a tube axis of at least one of the small diameter protective tube and the large diameter protective tube, into a non-circular shape by pressing and deforming the circular sectional shape by at least a predetermined amount or more, wherein the section deforming step is performed prior to the protective tube inserting step.

3. The protective tube attaching method according to claim 2, further comprising:

a friction engagement step of rotating the small diameter protective tube and the large diameter protective tube relatively to each other with a predetermined angle around the tube axis after the circular sectional shape perpendicular to the tube axis of each of the small diameter protective tube and the large diameter protective tube is formed into the non-circular shape, wherein the friction engagement step is performed prior to the protective tube fixing step.

4. The protective tube attaching method according to claim 2, wherein the section deforming step is a winding step in which at least one of the small diameter protective tube and the large diameter protective tube, which is extrusion-molded into the circular sectional shape, is wound on a take-up reel so that the circular sectional shape is pressed and deformed by at least the predetermined amount.

5. The protective tube attaching method according to claim 1, further comprising:

a curved shape deforming step of forming at least one of the small diameter protective tube and the large diameter protective tube into a curved shape which is curved along a longitudinal direction of the at least one of the small diameter protective tube and the large diameter protective tube by at least a predetermined amount, wherein the curved shape deforming step is performed prior to the protective tube inserting step.

6. The protective tube attaching method according to claim 5, wherein the curved deforming step is a winding step in which at least one of the small diameter protective tube, and the large diameter protective tube which is molded by extrusion, is wound on a take-up reel so as to be deformed into a curved shape which is curved along a longitudinal direction of the at least one of the small diameter protective tube and the large diameter protective tube by at least the predetermined amount.

* * * * *